March 22, 1966 — G. SIEBOL — 3,241,421

LOCK BOLT

Filed April 9, 1963 — 2 Sheets-Sheet 1

INVENTOR
GEORGE SIEBOL
BY HIS ATTORNEYS
HARRIS, KIECH, RUSSELL & KERN

March 22, 1966  G. SIEBOL  3,241,421
LOCK BOLT
Filed April 9, 1963  2 Sheets-Sheet 2
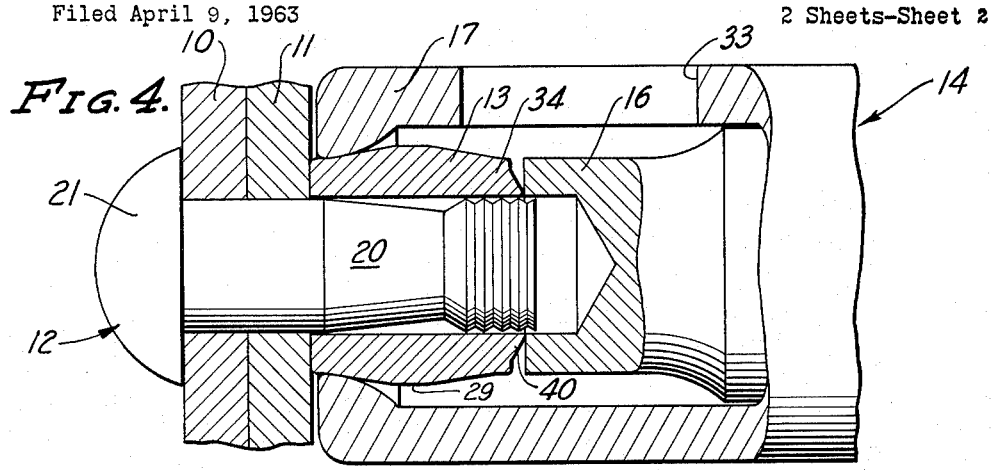
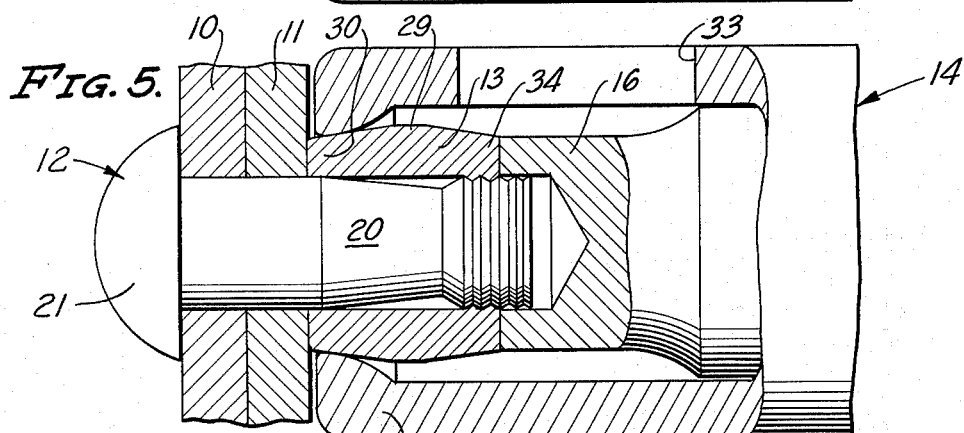
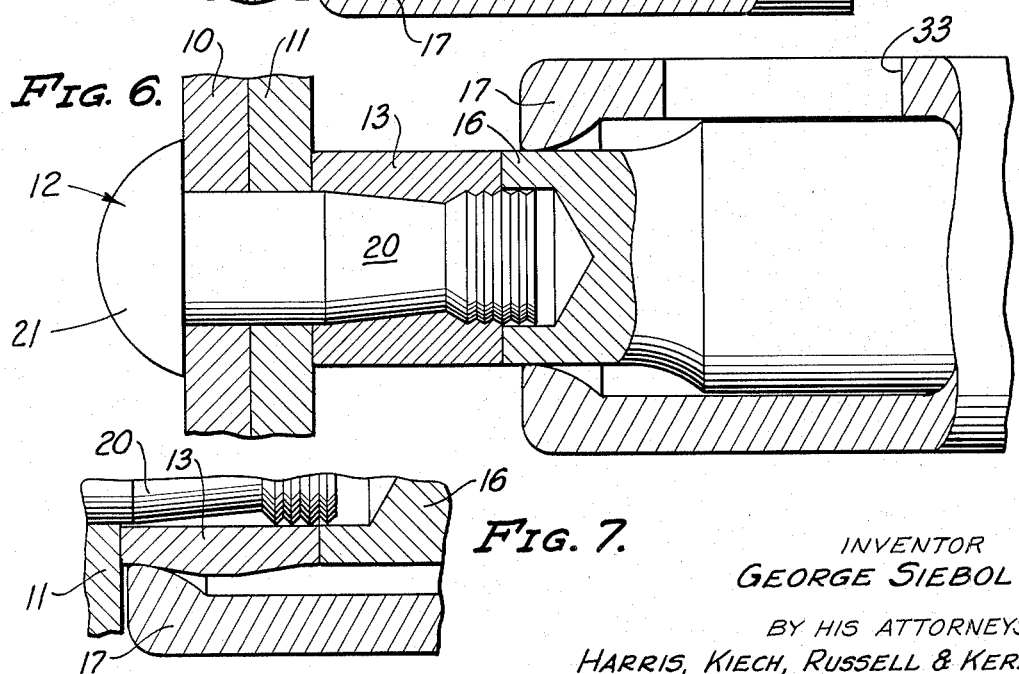
INVENTOR
GEORGE SIEBOL
BY HIS ATTORNEYS
HARRIS, KIECH, RUSSELL & KERN

United States Patent Office 3,241,421
Patented Mar. 22, 1966

3,241,421
LOCK BOLT
George Siebol, Garden Grove, Calif., assignor to Olympic Screw & Rivet Corporation, Downey, Calif., a corporation of California
Filed Apr. 9, 1963, Ser. No. 284,277
2 Claims. (Cl. 85—7)

This application is a continuation-in-part of my co-pending application entitled, "Lock Bolt and Method of Setting," Serial No. 793,797, filed February 17, 1959, now abandoned.

This invention relates to fastening devices and, in particular, to a lock bolt and a method of setting same which are improvements upon and substitutes for the presently used lock bolts, such as those shown in the United States patents to Huck, 2,531,048, 2,531,049, and 2,754,703, and Brilmyer, 2,804,798.

It is an object of the invention to provide a new and improved lock bolt and a method of setting lock bolts for joining two or more members having aligned openings. Another object is to provide a lock bolt and a method of setting wherein the bolt may be loaded prior to and during swaging, i.e., the bolt is placed in tension with a resultant compression of the members to be joined. A further object is to provide means for producing a predetermined magnitude of preload.

It is an object of the invention to provide a lock bolt carrying grippable means on the stem for applying a tension force to the stem of the bolt. A further object is to provide a lock bolt having a small extension on the stem for gripping by a pulling chuck, which extension comprises a very small portion of the over-all length of the bolt. Another object is to provide such a bolt wherein the small extension or knob may be broken off after setting if desired. A further object of the invention is to provide a lock bolt wherein the grippable means is a portion of the stem over which the collar is swaged, thereby completely eliminating waste and throw-away material and doing away with the gripping collet in the setting gun.

It is an object of the invention to provide a lock bolt and a method of setting bolts wherein, in contrast to the prior lock bolts and methods in which the collar material is moved toward the members being joined, the collar is swaged into the stem by pulling the swaging tool over the collar away from the members being joined, thereby providing superior engagement between the stem and collar. Another object is to provide a lock bolt and method of setting wherein excess collar material is pulled over the stem end of the bolt away from the members being joined so that dimensional variations in the collar and/or stem do not adversely affect the quality of the completed fastening. A further object is to provide such an article and method wherein the swaging force is not limited by the force which will fracture a breakneck on the bolt.

It is an object of the invention to provide a lock bolt which is adapted for setting with a riveting or swaging gun wherein the collars may be positioned on the stem by the gun and wherein the collars may be fed into the gun from a magazine. It is an object of the invention to provide a method of setting a lock bolt including applying a compression force to the collar to compress the members being joined together against the head of the bolt and while maintaining the compression force, swaging the collar into the stem by pulling a swaging tool over the collar in a direction away from the aligned members. A further object of the invention is to provide such a method wherein the stem is prestressed by first applying a pulling force to the stem. A further object is to provide such a method wherein the stem is prestressed by first engaging the exposed end of the collar with the stem so that the initial swaging force will produce a tension force in the stem with a resultant compression of the members to be joined.

The invention also comprises novel details of construction and novel combinations and arrangements of elements and steps, which will more fully appear in the course of the following description. The drawings merely show and the description merely describes preferred embodiments of the present invention which are given by way of illustration or example.

In the drawings:

FIGS. 4, 5 and 6 are views corresponding to FIGS. 1, 2 and 3, respectively, of an alternative embodiment of the invention; and FIG. 7 is a partial sectional view of another alternative form of the invention.

Figure 1:
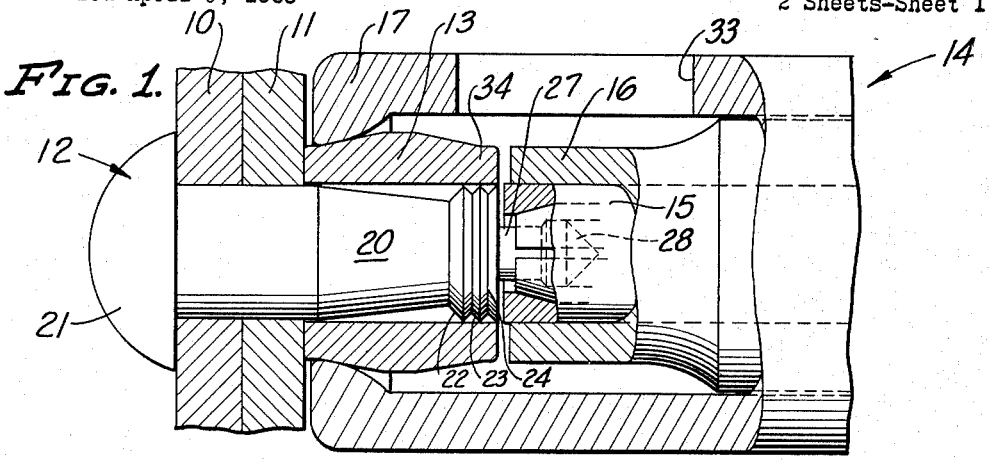
FIG. 1 is a sectional view of a preferred embodiment of the invention showing the lock bolt in position with a setting gun.
Figure 2:
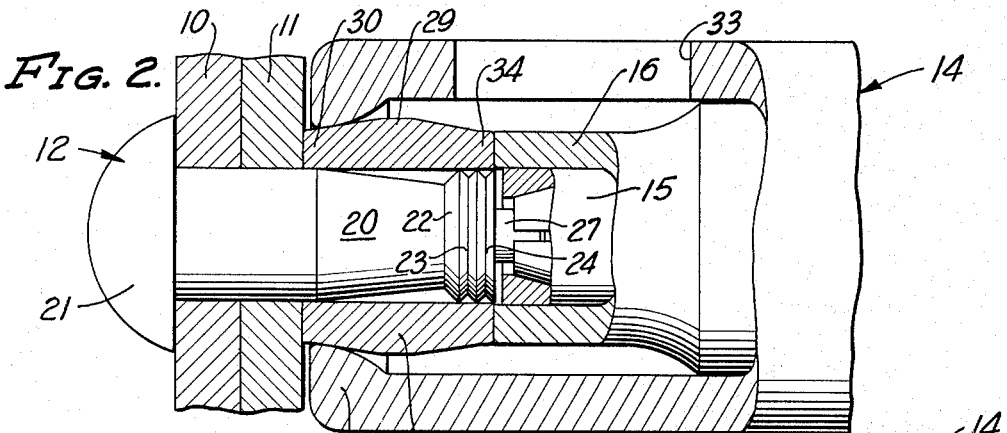
FIG. 2 is a view similar to FIG. 1 showing the bolt partially set.
Figure 3:
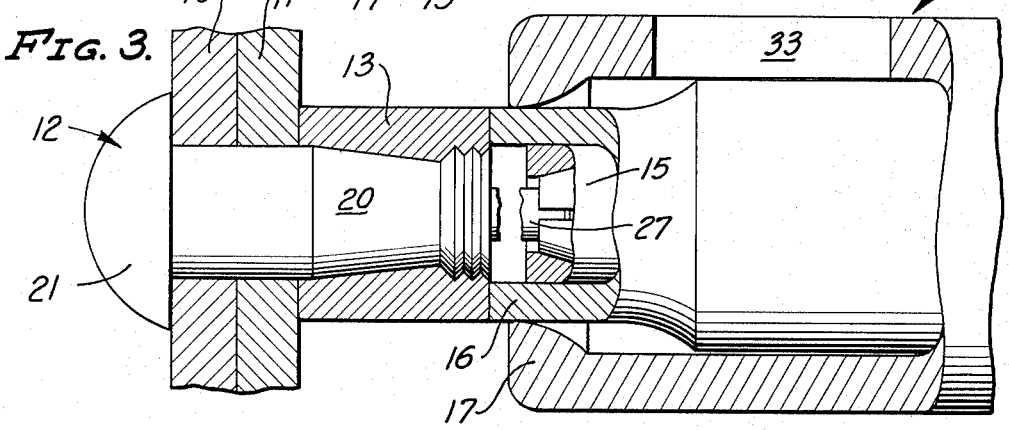
FIG. 3 is a view similar to FIG. 1 showing the bolt after the setting operation is complete.

Turning now to the embodiment of FIGS. 1, 2 and 3, members 10 and 11, which may be metal sheets or the like, are fastened together by a lock bolt comprising a bolt 12 and a collar 13 using a setting tool or gun 14 comprising telescopingly positioned collet 15, anvil 16 and swaging tool 17. The bolt 12 has a stem 20 which is inserted through aligned openings in the members 10, 11 and a head 21 which bears against an outer surface of the aligned members.

A number of annular grooves 22, 23, 24 on the stem 20 provide zones of reduced cross-sectional area into which the collar material is swaged during the setting operation. The number and shape of these grooves are not critical to the invention, although a preferred form for the grooved stem is shown in the drawing. A short extension 27 terminating in a knob 28 is projected axially from the stem and provides means for gripping the stem and applying a tension force thereto.

The collar 13 is slidably positioned over the portion of the stem which projects from the aligned members 10, 11 and is provided with a central portion 29 having a greater outside diameter than an end portion 30 which bears against the members to be joined.

In the setting operation, the collet 15 and anvil 16 of the setting gun are retracted to the right and a collar is fed into the interior of the ring-shaped swaging tool 17 through an opening 33. The collars may be manually positioned within the gun or a feed magazine may be coupled to the opening 33 for automatically supplying collars as desired. Then the open end of the gun is positioned around the stem of the bolt and the collet 15 is advanced to the left to engage the knob 28. Then the anvil 16 is advanced to the left to close the collet around the knob (see FIG. 1). The lock bolt and gun are now in position for setting.

A pulling force is now applied to the stem to place the stem in tension and compress the members 10, 11 against the head of the bolt. This is accomplished by advancing the anvil 16 to engage the end 34 of the collar and pulling or retracting the collet 15. The amount of preload on the bolt can be controlled exactly by controlling the pulling force exerted by the gun. This force is independent of the configuration of the bolt or the collar or the members being joined and may be adjusted to any desired value.

While the desired pulling force is maintained on the stem, the swaging tool 17 is also pulled to the right over the collar to swage the collar material into the grooves of the stem as shown in FIG. 3, the resulting outside diameter of the collar corresponding to the diameter of the opening in the swaging tool. The anvil may now be retracted to the right, permitting the collet to expand and release the knob for removing the setting tool from the set bolt. Alternatively, the pulling force on the collet may be increased to break off the extension 27 as shown in FIG. 3. Ordinarily, the extension will be provided with an annular groove or zone of reduced strength to serve as a breakneck for removing the knob.

The invention as described above provides a lock bolt which may be prestressed to any desired magnitude that may be varied to suit different applications. Furthermore, the swaging force exerted on the collar is independent of this preload and is not dependent upon the maximum strength of any breakneck built into the bolt. The cross-sectional area of the zone of reduced strength forming the breakneck may be of such value relative to the cross-sectional area of the collar that the axial force required for swaging the collar is greater than the axial force required to remove the knob. This structural arrangement permits the design of the collar and stem to be independent of the breaking strength of the stem breakneck and particularly enables manufacture of bolts with high strength collars which require swaging forces considerably greater than that force which will break off the pre-tension gripping portion of the bolt. Furthermore, it should be noted that the preloading extension or knob constitutes only a very small portion of the over-all size of the bolt thereby providing a tremendous waste reduction, and hence, saving in cost of material. The swaging tool travels completely over the collar, insuring swaging of collar material into the stem grooves throughout the length of the collar. Excess collar material is swaged over the end of the collar or the collar length is increased and there is no build-up to limit movement of material.

The embodiment of FIGS. 4, 5 and 6 provides a lock bolt similar to that of FIGS. 1, 2 and 3 while omitting the extension 27 and knob 28 and, hence, completely eliminating material wastage. Corresponding parts in this embodiment are identified by the same reference numerals as in the previous embodiment. An axially extending annular lip 40 is provided at the end 34 of the collar, the lip preferably tapering toward the inner bore of the collar substantially as shown in FIG. 4. The collet 15 is omitted from the setting gun and the annular grooves adjacent the projecting end of the stem serve as the means for gripping the bolt to apply the preload thereto.

In setting this fastener, the stem of the bolt is inserted through the aligned openings of the members being joined and the collar is fed into the gun as in the previous embodiment. After the tool is placed over the exposed end of the stem, the anvil 16 is advanced to engage the lip 40 with the swaging tool 17 engaging the collar 13 as shown in FIG. 4. Then as a pulling force is applied to the swaging tool 17, the lip 40 is first compressed by the anvil 16 into the grooves of the stem as shown in FIG. 5. This provides a grip for the collar on the stem and as the swaging tool 17 is pulled to the right, the collar exerts a tension force on the stem providing the desired preloading on the bolt. After the lip of the collar has been deformed into the grooves of the stem and the anvil 16 is firmly abutted against the end 34 of the collar, the main body of the collar is swaged inwardly by the action of the swaging tool moving over the collar to the position as shown in FIG. 6. In choosing the relative sizes of the stem, collar and swaging tool, it is preferred to dimension the parts so that there is an excess of material to be moved on the collar by the swaging ring over that which can be received by the grooves of the stem to produce some wire drawing or longitudinal extension of the collar and thereby increase the tension force applied to the bolt.

Stated differently, the volume of the space defined by the grooves or zones or reduced cross-sectional area of the stem is preferably less than the volume of collar material outside an imaginary cylinder having the diameter of the opening of the swaging tool 17, so that the grooves are filled by the inward swaging or extrusion of collar material as the swaging ring or tool is moved along the collar and so that the excess of collar material produces an axial elongation force in the collar. This axial elongation force in the collar acts between the member 11 and the bolt stem 20 at the engagement of the collar lip and stem groove to tension load the bolt and to compress the members 10, 11 together.

Ordinarily, the diameter of the opening of the swaging ring or tool will be only slightly greater than that of the end portion 30 of the collar permitting the tool to be positioned about the collar. The tool opening could be made somewhat larger than the collar end but the loose fit would tend to produce misalignments and is not desired.

It should be noted that the extruded collar material does not have to fill all of the grooves of the stem. The tension loading on the bolt can be obtained in the manner described above if the excess material of the collar that is moved during the initial portion of the swaging operation is greater than the volume of the space defined by the groove or grooves adjacent the members being joined, such that a collar elongation force is generated during this initial portion of the swaging movement. Such loading of the collar will be retained even though the total excess collar material is not sufficient to completely fill all the grooves of the stem. Referring to the example illustrated in the drawings, the volume of extruded collar material should more than fill the first groove 22 both to provide adequate locking engagement and to axially load the collar. However, it is not necessary that all subsequent grooves be filled. The axial elongation force produced in the collar during filling of the first groove will be retained and the desired bolt tension will be achieved.

Another alternative form of the invention is shown in FIG. 7 wherein the initial load on the members being fastened is achieved by backing up the head 21 of the bolt in the conventional manner and applying a compression force against the collar 13 via the anvil 16, compressing the members 10, 11 against the head 21. Then while this compression force is maintained, the swaging tool 17 is pulled over the collar 13 to form the collar material into the grooves of the stem, the set fastener having the same appearance as that of FIG. 6.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:
1. In a fastener for joining a plurality of members having aligned openings, the combination of:

a bolt having a stem for passing through the aligned openings and a head at one end for engaging one outer surface of the aligned members, with the other end having at least one zone of a reduced cross-sectional area for receiving swaged material, and a gripping portion projecting axially from said stem, and having a circumferential zone of reduced strength for a breakneck; and a collar having planar ends and an internal diameter substantially equal to the diameter of said stem and being slidable over said other end of said bolt to engage the opposing outer surface of the aligned members with one end of said collar for transmitting axial compressive forces to the members from an anvil abutting the other end of said collar, with a portion of said collar remote from said one end being of greater outside diameter than at said one end and adapted for swaging into said zone of reduced cross-sectional area when the bolt is set by pulling of a swaging ring over said collar from said one end away from the aligned members, the volume of space between said collar and said zone of reduced cross-sectional area being less than the volume of said collar outside an imaginary cylinder which is equal in diameter to the final diameter of the collar when swaged, whereby the pulling force causes said collar to elongate and exerts a tension force on said stem, the cross-sectional area of said zone of reduced strength being of such value relative to the cross-section area of said collar that the axial force necessary to apply to the outer surface of said collar to swage the same is greater than the force under which said zone of reduced strength will part.

2. In a fastener for joining a plurality of members having aligned openings, the combination of:

a bolt having a stem for passing through the aligned openings and a head at one end for engaging one outer surface of the aligned members, with the other end having a plurality of reduced zones of cross-sectional area less than that of the stem for receiving swaged material; and a collar having planar ends and an internal diameter substantially equal to the diameter of said stem and being slidable over said other end of said bolt to engage the opposing outer surface of the aligned members with one planar end of said collar for transmitting axial compressive forces to the members, the other planar end of said collar having an axially extending, annular lip tapering outwardly therefrom toward the axis of said collar whereby an axial force from an abutting anvil forces said lip into one of said zones, with an intermediate portion of said collar being of greater outside diameter than at said ends and adapted for swaging into intermediate reduced zones between said one zone and said aligned members when the bolt is set by pulling of a swaging ring over said collar from said one end away from the aligned members, the volume of space between said collar and said intermediate zones of reduced cross-sectional area being less than the volume of said collar outside an imaginary cylinder which is equal in diameter to the final diameter of the collar when swaged whereby said pulling force causes said collar to elongate and exerts a tension force on said stem through said lip.

References Cited by the Examiner
UNITED STATES PATENTS

| | | | | |
|---|---|---|---|---|
| 2,531,048 | 11/1950 | Huck | | 85—5 |
| 2,531,049 | 11/1950 | Huck | | 85—5 |
| 2,955,505 | 10/1960 | Schuster | | 85—37 |
| 3,057,246 | 10/1962 | Brilmyer | | 85—5 |

CARL W. TOMLIN, *Primary Examiner.*

EDWARD C. ALLEN, *Examiner.*